United States Patent [19]

Okazaki

[11] 4,128,770

[45] Dec. 5, 1978

[54] AUTOMATICALLY RETURNING APPARATUS FOR TURN SIGNAL LAMP SWITCH

[75] Inventor: Kunio Okazaki, Hatano, Japan

[73] Assignee: Stanley Electric Co., Ltd., Tokyo, Japan

[21] Appl. No.: 728,172

[22] Filed: Sep. 30, 1976

[30] Foreign Application Priority Data

Jan. 29, 1976 [JP] Japan .................................. 51/008818

[51] Int. Cl.$^2$ .............................................. H02G 3/00
[52] U.S. Cl. .................................. 307/10 LS; 307/141; 340/56
[58] Field of Search ...................... 307/10 LS, 9, 10 R, 307/141, 141.1, 141.4; 340/67, 73, 72, 74, 76, 81 R, 81F, 56; 315/82, 83; 361/195, 196, 186

[56] References Cited

U.S. PATENT DOCUMENTS

| | | | |
|---|---|---|---|
| 2,767,391 | 10/1956 | MacMahon | 340/81 R |
| 3,110,011 | 11/1963 | Burson, Jr. | 340/56 |

Primary Examiner—Robert K. Schaefer
Assistant Examiner—Morris Ginsburg
Attorney, Agent, or Firm—Flynn & Frishauf

[57] ABSTRACT

An automatically returning apparatus for turn signal lamp switch includes a semiconductor switching circuit for detecting a certain running distance of vehicle after the throwing of the turn signal lamp switch, a driving circuit for energizing a solenoid provided to cause the turn signal lamp switch to return to its non-operating position and a circuit for maintaining continuous operation of the solenoid for a given time after the turn signal lamp switch starts its opening or returning operation.

10 Claims, 2 Drawing Figures

AUTOMATICALLY RETURNING APPARATUS FOR TURN SIGNAL LAMP SWITCH

BACKGROUND OF THE INVENTION

The present invention relates to an automatically returning apparatus for a turn signal lamp switch and, particularly to an automatically returning apparatus for a turn signal lamp switch which is adapted to release a thrown switch of a turn signal lamp, thereby permitting it to automatically return to its original position.

In the prior art, there is an automatically returning apparatus for a turn signal lamp switch for vehicles adapted to release by changing an operation of the handle the turn signal lamp switch thrown for indicating in advance the direction of the vehicle when effecting an alteration of a course. However, such an automatically returning apparatus cannot apply for a vehicle without accompanying substantially a rotary operation of the handle when altering such a course, as in two-wheeled vehicle.

As a manner for releasing direction indication without accompanying the handle operation, there has been devised an idea that the direction indication is released after a certain predetermined time after throwing of a turn signal lamp switch. However, this arrangement has an inconvenience that the direction indication is released before the course alteration is completed when there is delay in effecting the course alteration. Also, in a release mechanism for a turn signal lamp switch by the handle operation mounted on a four-wheeled car, the release operation must be effected by the driver when not accompanying the changing operation indicated by the position of the handle, for example, altering the vehicle advancing course.

Further, in the prior art, there is proposed an automatically returning apparatus for a turn signal lamp switch which does not release the direction indication until the vehicle runs a certain predetermined time and distance after throwing of the turn signal lamp switch.

Such an automatically returning apparatus detects running time and running distance with a semiconductor switching circuit when the turn signal lamp switch is thrown by manual operation, thereby permitting actuation of a solenoid which drives the return of the switch.

The turn signal lamp switch conventionally used has a mechanical structure. For example, the structure is so constituted that the switch is thrown by bringing down the operating lever and moreover has a holding force exerted by a spring or the like so as to prevent release caused by oscillation or the like, or that the switch is thrown by sliding the operating lever and moreover has a holding force also exerted by a spring or the like. Accordingly, in effecting the release of such a switch, one cannot expect its sure returning operation if the solenoid for returning the switch is momentarily actuated by the aforementioned semiconductor switching circuit. This is because the aforementioned mechanical switch necessitates about 400 milliseconds (ms) in order to fully return the operating lever while the operating time of the semiconductor-switching circuit for detecting the running distance and time is 10-20 ms at the most. Therefore, the semiconductor switching circuit may fail to return the switch operating lever due to the short operating time of the switching circuit and the long operating time of the solenoid.

OBJECTS OF THE INVENTION

It is an object of the present invention to provide an automatically returning apparatus for a turn signal lamp switch which can eliminate the defects of the conventional apparatus above mentioned and which can provide sure operation.

It is another object of the invention to provide an automatically returning apparatus for a turn signal lamp switch which is provided with means for maintaining operation of the returning solenoid until the turn signal lamp switch fully returns and is held at the original positon.

SUMMARY OF THE INVENTION

In accordance with the present invention, there is provided an automatically returning apparatus for a turn signal lamp switch which provides a contact for detecting an ON-OFF signal by opening and closing in response to rotation of wheels after throwing the turn signal lamp switch, a switching circuit for detecting the ON-OFF signal and adapted to be conductive when the ON-OFF signal reaches a certain value, a driving circuit responsive to conduction of the switching circuit for energizing a solenoid for return of the turn signal lamp switch, and a circuit for maintaining the energization of the solenoid during a time that the turn signal lamp switch requires to fully return to its non-operating position.

BRIEF DESCRIPTION OF THE DRAWINGS

The above and other objects and advantages of the present invention will best be understood from the following description taken with respect to the accompanying drawing, in which.

DETAILED DESCRIPTION OF THE INVENTION

Figure 1:
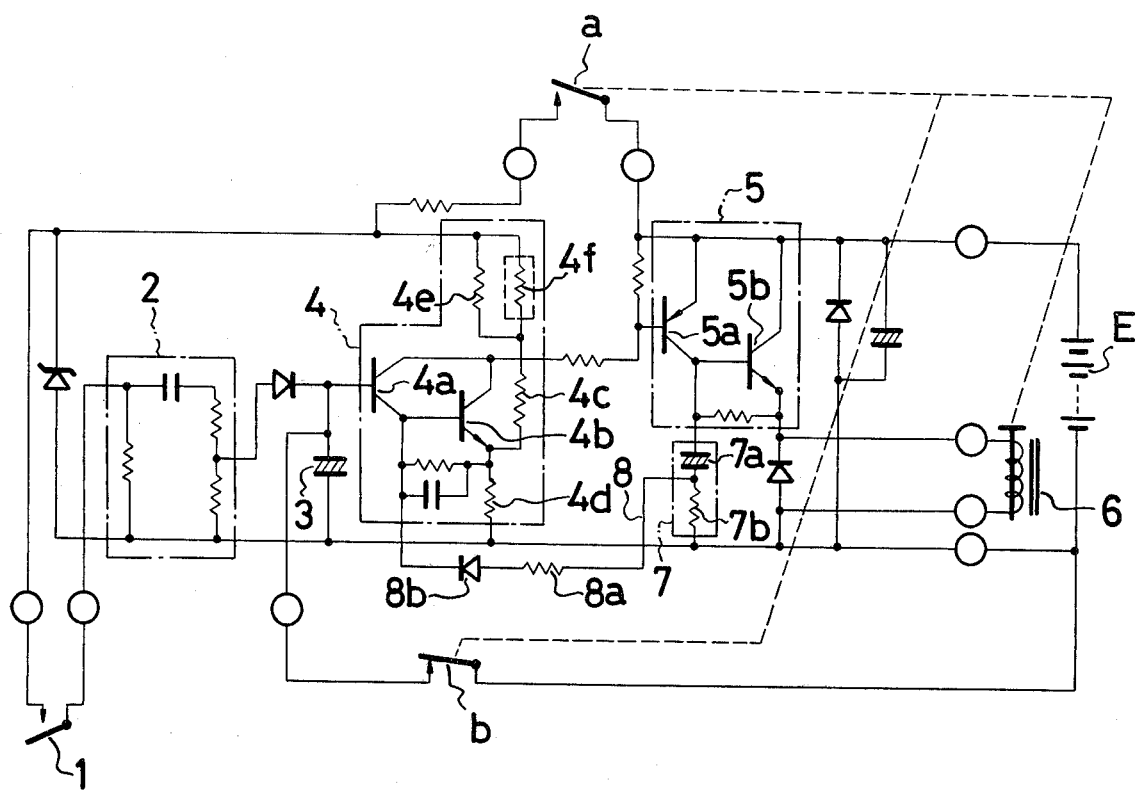
FIG. 1 is a circuit diagram showing an automatically returning apparatus for a turn signal lamp switch according to the present invention.
Figure 2:
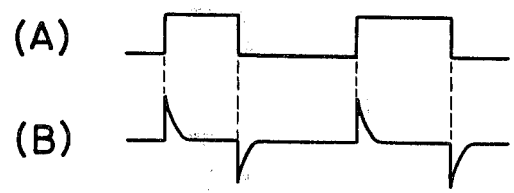
FIG. 2 is a wave-form chart of the output of an essential part in FIG. 1.

In FIG. 1, a switch contact 1 is provided to open and close in respect to rotation of wheels of a two-wheeled vehicle. An output wave-form such as shown in FIG. 2(A) is obtained by the opening and closing operation of the contact 1. A differentiating circuit 2 is provided to differentiate the output produced by the opening and closing of the contact 1 so as to obtain an output waveform shown in FIG. 2(B). A capacitor 3 is charged by the output from the differentiating circuit 2. Thus, the contact 1 sends out an output corresponding to the number of revolutions of the wheels of the two-wheeled vehicle. This output is differentiated at the differentiating circuit 2 and the capacitor 3 is charged by the output from the differential circuit 2. As a result, the charging potential on capacitor 3 attains a certain potential after the vehicle runs a certain distance.

A turn signal lamp switch "a" is mounted on the two-wheeled vehicle. By throwing this switch, electric current is caused to pass to a turn signal lamp (not shown). Provided to operatively connect with the switch "a" is a switch "b" which opens when the switch "a" is thrown closed and which closes when the switch "a". The reason for providing the switch "b" is to insure the return of the switch "a" when the vehicle runs a certain distance after throwing of the switch "a".

A switching circuit 4 comprising transistors 4a and 4b in a Darlington connection is caused to conduct when the terminal voltage of the capacitor 3 attains a certain value. In this case, since an emitter terminal of the transistor 4b is held at a voltage divided by resistors 4c and 4d the switching circuit will provide the desired function when the terminal voltage of the capacitor 3 attains a sufficient value in excess of the divided voltage value.

Further, a resistor 4e and a thermistor 4f are provided to act as a temperature compensation of the transistors 4a and 4b.

Accordingly, the switching circuit 4 conducts current after running the certain distance after throwing of the switch "a".

A driving circuit 5 is constituted by transistors 5a and 5b to drive a solenoid 6. When the switching circuit 4 conducts, this causes the driving circuit 5 to conduct current and to provide excitation and operation of the solenoid 6. Further, by this excitation, the switch "a" thrown by the manual operation is actuated to return to its "open" condition and at this time the switch "b" is caused to close to discharge the capacitor 3.

A timer circuit 7 is constituted by a capacitor 7a and a resistor 7b. A charging current to the capacitor 7a of the timer circuit is coupled to a base terminal of the transistor 4b of the switching circuit 4 through a feedback circuit 8, the feedback circuit 8 including a resistor 8a and a diode 8b for preventing reverse current. In operation, the switch "a" initiates its release by the excitation of the solenoid 6 and after the intermittent signal from switch contact 1 has been not applied to the switching circuit 4, conducting current for the transistor 4b and the driving circuit 5 is continued for the charging time of the capacitor 7a of the timer circuit whereby the solenoid 6 is maintained in its excited condition a short time longer to insure that the switch "a" is held in its open condition.

In operation of the apparatus according to the invention having the above structure, if now the switch "a" of the turn signal lamp was thrown, an intermittent output signal having the wave-form shown in FIG. 2(A) provided by the contact 1 is differentiated by the differentiating circuit 2 and the capacitor 3 is charged by the differentiated output having the wave-form shown in FIG. 2(B). In this case, since the switch "b" is open, the capacitor 3 is allowed to attain a certain voltage by obtaining a predetermined number of differentiated output pulses. As a result, the switching circuit 4 conducts current and also the driving circuit 5 conducts current.

By the conducting current of the driving circuit 5, the solenoid 6 is excited or energized and acts to open the switch "a". Further, the switch "a" initiates its opening and after the power source passing to the contact 1 was cut off, the conducting current condition of the transistor 4b of the switching circuit 4 is maintained by the action of the timer circuit 7 through the feedback circuit 8. Thus, since the driving circuit 5 also continues its conducting current condition under the influence of the timer 7, the solenoid 6 is maintained excited during the timing period and acts to permit the switch "a" to surely return to its open position.

Accordingly, with the apparatus according to the invention, the circuit function can be determined to continue the operating time of the solenoid after the switch "a" initiates its opening operation and until the switch "a" of the mechanical operating switch fully returns or until the switch "a" is given a driving force which can fully return the switch "a" and can overcome a prior art working deficiency occurring from a relationship between a time (about 400 ms) necessitating to the return of the throwing switch and a much shorter operating time of the semiconductor switching circuit of the apparatus. The defects of the conventional apparatus occurring from the above time difference, that is, the switch remains in the thrown condition and the turn signal lamp continues the flashing operation, can be fully eliminated.

It will be apparent to those skilled in the art from the above description that the automatically returning apparatus for a turn signal lamp switch according to the present invention can be conveniently applied to all the running vehicles, for example, two-wheeled vehicles, three-wheeled vehicles, four-wheeled cars or the like.

Furthermore, while the invention has been described with respect to a preferred embodiment, such description is for illustrative purposes only, and it is to be understood that the invention is not limited thereto but may be otherwise variously embodied within the scope of the following claims.

What is claimed is:

1. An automatically returning apparatus in combination with a turn signal lamp switch of a wheeled vehicle, comprising:

a turn signal lamp switch (a,b) which includes at least a first switch (a), contact means (1) coupled to said turn signal lamp switch and to at least one wheel of the vehicle for opening and closing corresponding to the rotation of the wheels of the vehicle after throwing of said turn signal lamp switch and for generating a plurality of intermittent signals responsive to said wheel rotation, detecting means (2, 4) coupled to said contact means (1) for detecting said intermittent signals, said detecting means including switching means (4) for conducting current responsive to detection of a predetermined number of said intermittent signals, a solenoid (6) coupled to said turn signal lamp switch for returning said turn signal lamp switch to its non-operating position, driving circuit means (5) coupled to said switching means (4) and to said solenoid (6) and responsive to the conducting current of said switching means (4) for energizing said solenoid (6) for return of said turn signal lamp switch to its non-operating position, and circuit means (7, 8) coupled to at least one of (i) said switching means (4) and (ii) said driving circuit means (5), said circuit means including means for maintaining the energization of said solenoid (6) for a given period of time after initial energization of said solenoid (6) to insure that said turn signal lamp switch fully returns to its non-operating position.

2. The combination according to claim 1, wherein said turn signal lamp switch includes a second switch (b) which is operatively coupled with said first switch (a).

3. The combination according to claim 2 wherein said second switch (b) is coupled to said first switch (a) so as to be closed when said first switch (a) is opened, and to be opened when said first switch (a) is closed.

4. The combination according to claim 3 wherein said second switch (b) is coupled to said switching means (4) for disabling said switching means (4) when said second switch (b) is closed.

5. The combination according to claim 1 wherein said detecting means comprises a capacitor (3) coupling said contact means (1) to said switching means (4), said capacitor enabling said switching means when the charge thereon reaches a predetermined value responsive to detection of said predetermined number of said intermittent signals.

6. The combination according to claim 5 wherein said detecting means comprises a differentiating circuit (2) coupling said contact means (1) to said capacitor (3), said differentiating circuit differentiating said intermittent signals from said contact means (1).

7. The combination according to claim 1 wherein said detecting means comprises a differentiating circuit (2) coupling said contact means (1) to said switching means (4), said differentiating circuit (2) differentiating said intermittent signals from said contact means (1).

8. The combination according to claim 1 wherein said circuit means (7, 8) for maintaining the energization of said solenoid (6) includes a timer circuit (7).

9. The combination according to claim 8 wherein said timer circuit (7) is coupled to an output of said driving circuit means (5) and to an input of said switching means (4) for maintaining said switching means in its current conducting condition for a given period of time, thereby maintaining said solenoid (6) energized for said given period of time after initial energization of said solenoid.

10. The combination according to claim 8 wherein said timer circuit (7) comprises a capacitor (7a) coupled to a resistor (7b).

* * * * *